United States Patent Office 3,082,075
Patented Mar. 19, 1963

3,082,075
METHOD FOR INCREASING THE AVAILABILITY OF PHOSPHORUS TO PLANTS
John B. Hemwall, Long Beach, Calif., assignor to The Dow Chemical Company, Midland, Mich., a corporation of Delaware
No Drawing. Filed Dec. 5, 1958, Ser. No. 778,317
9 Claims. (Cl. 71—27)

The present invention relates to plant agronomy and particularly relates to improving growth of plant life in soil.

Many types of earth soils are substantially useless for the growth of vegetable and plant life therein, typical of such soils being those of rocky types, shales, basalts, and limestone character. Such soils or potential soil material are present in the earth's crust in huge amounts but they have heretofore been unavailable, from a practical standpoint, for the useful and economical growth of vegetable and plant life therein.

The basic importance of soil in food production requires that attention be directed to chemical composition of soil in relation to crop needs and particularly to availability of the elements to the plants. Plants are able to utilize only a small fraction of the total quantity of any element present in soils. Although many primary minerals may be considered storehouses of plant nutrients, the release of elements is often not sufficiently rapid in the weathering process to support intensive crop production. Among the soil components essential for plant growth is phosphorus. The phosphorus is present in soil in both organic and in inorganic combinations. Although it is present preponderantly in inorganic combination, it may be found in organic combination from as little as 3 percent in some soils to as much as 75 percent in other soils. In organic combination, phosphorus occurs in phospholipids, nucleic acids, inositol phosphates, phosphoproteins, etc. In inorganic combination, the phosphorus occurs substantially completely as salts of orthophosphoric acid.

Phosphorus, to be beneficial to the plant, must be absorbed from the soil by the plant root system. The understanding of the processes taking place during the uptake of phosphorus is still incomplete but it has been observed that the plant response to phosphorus is a function of the solubility of the phosphorus present and it is believed that the anionic form $H_2PO_4^-$ is the form most utilized by the plants. It has further been observed that any factor altering this solubiliy will alter plant growth. Phosphorus as well as other minerals in the soil are frequently "fixed," i.e., the readily soluble plant nutrients are changed to less soluble forms by reaction with inorganic or organic components of the soil with the result that the nutrients become restricted in their mobility in the soil and suffer a decrease in availability to plants. Routes whereby the nutrient elements become fixed have been postulated as chemical or physical adsorption and double decomposition. It is generally accepted that more than one route is involved in the fixation process. It is desirable in the practice of agronomy that a method may be found to make the "fixed" phosphorus more available for plant nutrition. Furthermore, it is desirable to prevent or to slow down this fixation of phosphorus and to maintain the phosphorus in a form available to plants.

It has been found according to the present invention, that by the addition of small quantities of an alizarin compound to growth medium plants are benefited, this benefit manifesting itself in more rapid growth, earlier maturity, healthier plants, and greater yields. It has also been found that by the addition of an alizarin compound, the phosphorus present in the soil or added thereto in fertilizer compositions is made available and maintained available in a form assimilable by plant life. It has further been found that by the practice of the present invention, the phosphorus uptake from soil by plants is enhanced. Furthermore, it has been found that by the incorporation of the alizarin compound that the phosphorus made available to the plant is greater than the effect obtained by doubling the amount of phosphate fertilizer added to the soil.

The alizarin compounds suitable for the practice of this invention are defined as those having the formula

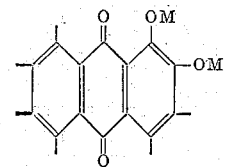

wherein each of the free valences is satisfied by a radical selected from the group consisting of —H, —Cl, —Br, —I, —OM, —NH$_2$, —NO$_2$, —SO$_3$M, —COOM —COCH$_3$, —CH$_3$ and hydroxyalkyl radicals containing no more than seven carbon atoms and wherein each M is independently selected from hydrogen, alkali metal, ammonium and substituted ammonium. By "substituted ammonium" is meant mono-, di-, tri- and tetra-alkyl ammonium radicals wherein the alkyl radical contains from 1 to 4 carbon atoms, inclusive. By the expression "hydroxyalkyl radicals containing no more than seven carbon atoms" is meant such groups as are residues of sugars, sugar acids, sugar alcohols, polyhydric alcohols, ketoalcohols and amino sugars. Alizarin compounds suitable for use in the present invention include 5,8-dichloroalizarin,
3,4-dibromoalizarin,
3-bromoalizarin,
3-iodoalizarin,
1,2,4,5,8-pentahydroxyanthraquinone,
1,2,4,5,6,8-hexahydroxyanthraquinone,
anthragallol, flavopurpurin, rufigallic acid,
(1,2,3,5,6,7-hexahydroxyanthraquinone),
4-nitro-1,2-dihydroxyanthraquinone,
4-amino-1,2-dihydroxyanthraquinone,
1,2,3-trihydroxyanthraquinone,
sodium 1,2-dihydroxyanthraquinone-5-sulfonate,
sodium 1,2-dihydroxyanthraquinone-8-sulfonate,
1,2,4-trihydroxyanthraquinone,
1,2,5-trihydroxyanthraquinone,
3-amino-1,2,4-trihydroxyanthraquinone,
3-nitro-1,2,6-trihydroxyanthraquinone,
1,2,4-trihydroxyanthraquinone-3-carboxylic acid, sodium 1,2,6-trihydroxyanthraquinone-3-sulfonate,
disodium 1,2,4,5,6,8-hexahydroxyanthraquinone-3,7-disulfonate,
1,2,4,5,7,8-hexahydroxyanthraquinone
3-nitro-1,2,4,5,7,8-hexahydroxyanthraquinone,
tetramethylammonium 1,2-dihydroxyanthraquinone-5-sulfonate,
tris(isopropyl)ammonium 1,2-dihydroxyanthraquinone-5-sulfonate and
tertiary-butylammonium 1,2-dihydroxyanthraquinone-5-sulfonate.

These alizarin compounds are solids. They may be applied to growth media in any suitable form and by any means usually employed for administration of organic chemicals to growth medium. By the expression "growth medium" is meant any medium suitable for the planting and growing of vegetables and plant life. Thus, the expression is meant to encompass not only soil but also sand, liquid nutrient medium and "synthetic soil" compositions such as sponge rock, peat, etc. and materials sold under trade names such as "Black Magic." However, the invention primarily is concerned with the application of alizarin compounds to natural soil. Included in the expression "natural soil" is a range of soil compositions from that which contains predominantly mineral matter to that which is relatively high in organic matter. In the practice of this invention the alizarin compound may be added to acid or alkaline soil, to highly calcareous soil or soil containing as much as from 50 to 80 percent organic matter. It is suitable for use in both sandy soil and in heavy clay soil.

In carrying out the operation in accordance with the present invention, the alizarin compound is distributed in plant growth media. It may be distributed in an unmodified form but is preferably intimately dispersed in a carrier with or without the inclusion of other additaments. By "carrier" is meant any solid or liquid agent with which the alizarin compound may be employed. Thus, the carrier may be water, aqueous dispersions, organic liquid carriers, solid fertilizers, an aqueous fertilizer composition or inert dust. Administration to the soil of the alizarin compound as a constituent of phosphate containing fertilizer compositions constitutes a preferred embodiment of the present invention.

In applications to growth media, good results are obtained when the alizarin compound is supplied in an amount of from 0.25 to 250 parts or more per million parts by weight of the growth media. In applications to soil, good results are obtained when the alizarin compound is distributed at a rate of from 1 to 20 pounds or more per acre and through such cross-section of the soil as to provide for the presence therein of an effective concentration of the alizarin compound. The required amounts of alizarin compound may be supplied in from 1 to 100 gallons of organic solvent carrier in from 1 to 27,000 or more gallons of aqueous carrier, or in from about 20 to 2,000 pounds or more of solid carrier per acre, treated. When an organic solvent carrier is employed, it may be further dispersed in above volume of aqueous liquid carrier.

The exact concentration of alizarin compound to be employed in compositions for the treatment of growth media is not critical, provided that a minimum effective dosage is supplied in the media. The concentration of the alizarin compound may vary from 0.01 percent by weight to 95 percent by weight of the composition, depending on whether the composition is a treating composition or a concentrate composition and whether it is in the form of a solid or liquid.

Liquid concentrate compositions commonly contain from 2 to 50 percent or more by weight of the alizarin compound. These concentrate compositions are generally aqueous compositions although other solvents such as acetone, diisobutyl ketone, isopropyl alcohol, and petroleum distillates may be employed as liquid carrier. Such concentrate compositions preferably contain fertilizer and may contain dispersing agents, emulsifying agents such as condensation products of alkylene oxides of phenols and organic acids, alkyl aryl sulfonates, polyoxyalkylene derivatives of sorbitan esters, complex ether alcohols, mahogany soaps and the like. Liquid concentrate compositions may be diluted to prepare treating compositions. Liquid treating compositions preferably contain from 0.01 to 10 percent by weight of the alizarin compound.

Solid concentrate compositions commonly contain from 1 to 50 percent of the alizarin compound. In such compositions, the alizarin compound may be intimately dispersed with fertilizer or inert solid material such as solid surface-active dispersing agents, chalk, talc, pyrophyllite, attapulgite, fuller's earth, or bentonite. Such concentrate compositions may be further dispersed in fertilizer or other innocuous adjuvants to obtain treating compositions. When a fertilizer is used as carrier, the fertilizer may be organic or inorganic. Suitable fertilizers include phosphate containing fertilizers such as superphosphate fertilizers, mixed nitrogen-phosphorus-potassium fertilizers, ammonium nitrate and organic fertilizers. Solid treating compositions preferably contain from 0.1 to 25 percent by weight of the alizarin compound. Furthermore, the solid concentrate compositions may be dispersed in water with or without added dispersing agent or agents to prepare aqueous treating compositions as previously described.

The preferred embodiment of the present invention comprises distributing the alizarin compound in a phosphate-containing fertilizer composition. Such composition may contain the alizarin compound in from 0.5 to 20 percent by weight based on the weight of phosphorus in the fertilizer when the latter is calculated as phosphorus pentoxide.

In carrying out the operations in accordance with the present invention, an alizarin compound or a composition containing an alizarin compound is distributed in any suitable fashion in soil or other growth media, such as by simply mixing with growth media, by applying as a band beneath the seed row, by applying to the surface of soil and thereafter dragging or discing into the soil to the desired depth, or by employing a liquid carrier to accomplish the penetration and impregnation. The application of the spray and dust compositions may be carried out by conventional methods, e.g., with power sprayers or dusters, boom and hand sprayers, etc. Further, the distribution may be accomplished by introducing the alizarin compound into the water employed to irrigate the soil. If desired, the unmodified material may be employed, but generally a liquid or solid carrier composition containing the alizarin compound is applied to the growth media.

The following examples illustrate the invention but are not to be construed as limiting.

EXAMPLE 1

An aqueous nutrient treating composition containing labeled phosphoric acid was prepared by intimately mixing 45 parts by weight of 3-nitroalizarin having the formula

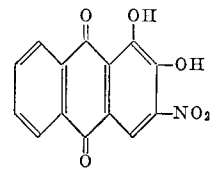

510 parts by weight of labeled phosphoric acid ($H_3P^{32}O_4$), 322 parts by weight of ammonium nitrate and 60,000 parts by weight of water.

A similar treating composition was prepared in which 3-nitroalizarin was replaced by an equal amount by weight of sodium 3-alizarinsulfonate having the formula

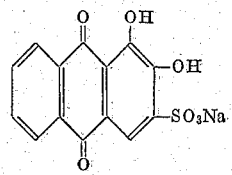

Six 10 milliliter aliquots of each of the compositions thus prepared were applied as a drench to pots containing 150 grams of calcareous soil having a pH of 7.8, and each having three tomato plants of about 2 inches in height growing therein. After treatment, the soil contained the following concentration of materials on a dry weight basis.

Materials:  Parts by weight per million parts by weight of soil
- Alizarin compound _____ 50
- Labeled phosphoric acid ($H_3P^{32}O_4$), calculated as $P_2O_5$ _____ 375
- Ammonium nitrate, calculated as nitrogen ____ 125

A check treatment was carried out in a similar manner employing a nutrient composition containing no alizarin compound.

The plants were allowed to grow for two weeks after treatment and the aerial portions then harvested. The harvested plants were dried and then pressed into planchets with a 2-ton press for making a count of radioactive phosphorus. From the unit weight of the sample and the total weight of harvested portions of the plant, the total uptake of radioactive phosphorus was determined according to a method similar to that described by A. F. MacKenzie and L. A. Dean in Analytical Chemistry, 22, 489–490 (1950). From the averages of the total uptake of the radioactive phosphorus in six samples treated with each alizarin compound and the averages of the total uptake in the check determinations, the percent increase in phosphorus uptake by the plants grown on soil treated with an alizarin compound over untreated check plants were calculated. The results were as follows.

Alizarin compound component of treating composition:

Percent increase in phosphorus uptake
- 3-nitroalizarin _____ 10
- Sodium 3-alizarinsulfonate _____ 21

EXAMPLE 2

An operation is carried out in a manner similar to that described in Example 1 but in which the following types of soil are employed:

A. Slightly saline, high organic matter (9.3 percent), acid (pH 5.6), loam.
B. Slightly saline, low organic matter (1.9 percent), alkaline (pH 7.7), slightly calcareous (2.3 percent calcium carbonate), sandy loam.
C. Slightly saline, low organic matter (1.4 percent), alkaline (pH 7.7), non-calcareous, sandy loam.
D. Highly saline, low organic matter (1.3 percent), alkaline (pH 7.4), non-calcareous, sandy loam.
E. Low organic matter (0.8 percent), alkaline (pH 7.7), slightly calcareous (1.5 percent calcium carbonate), sandy loam.
F. Low organic matter (0.6 percent), acid (pH 5.8), sandy loam.
G. Slightly saline, moderate organic matter (2.6 percent), alkaline (pH 7.85), moderately calcareous (6.4 percent calcium carbonate), loam.
H. Low organic matter, slightly acid (pH 6.6), clay loam.

It is found that in all cases the increase in phosphorus uptake by plants grown on soil treated with a nutrient composition containing an alizarin compound is greater than plants grown in soil treated with a nutrient composition containing no alizarin compound.

EXAMPLE 3

An aqueous nutrient dispersion is prepared in which the alizarin compound is alizarin having the structure

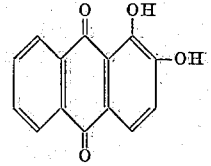

The composition of the aqueous dispersion is as follows.

Components:  Parts by weight per million parts by weight of aqueous dispersion
- Alizarin _____ 750
- Ammonium nitrate _____ 5400
- 85 percent phosphoric acid (sp. gr. 1.7) _____ 8500

Six 10 milliliter aliquots of the composition thus prepared is applied as a drench to pots containing 150 grams of soil (calcareous, pH 7.8) and in which three tomato plants of about 2 inches in height are growing. After treatment, the soil contains the following concentration of materials on a dry weight basis.

Components:  Parts by weight per million parts by weight of soil
- Alizarin _____ 50
- 85 percent phosphoric acid (calculated as $P_2O_5$) _____ 375
- Ammonium nitrate (calculated as nitrogen) ___ 125

A check treatment is carried out in a similar manner employing a similar nutrient composition containing no alizarin compound.

The plants are allowed to grow for two weeks after treatment. Thereafter, the aerial portions of the plants are harvested, dried and weighed, and determinations then made on the phosphorus uptake by the plants. The analysis for phosphorus is carried out chemically by digesting the harvested plant with nitric-perchloric acid mixture according to a method similar to that described on page 294 of "Soil and Plant Analysis," by C. S. Piper, Interscience Publishers, Inc., New York, 1944. The solutions resulting from the digestion are then analyzed for phosphorus employing the phosphomolybdate blue method as described by S. R. Dickman and R. H. Bray in Industrial and Engineering Chemistry, Analytical Edition, 12, 665–668, 1940. From the average phosphorus content of the plants treated with the composition containing alizarin and the phosphorus content of the plants in the check determination, phosphorus uptake by the plants grown on treated soil are compared with the check plant. It is found that there is greatly increased uptake by the plants grown on soil treated with the composition modified with alizarin.

EXAMPLE 4

A modified fertilizer composition is prepared by intimately mixing 5.73 grams of commercial triple superphosphate (0–45–0) fertilizer with 0.26 gram of anthrapurpurin having the structure

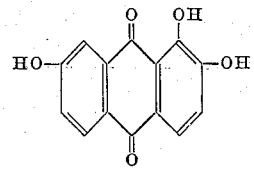

In this and subsequent fertilizer compositions, the values in the parenthesis indicate the available components as follows: (N—P$_2$O$_5$—K$_2$O). This corresponds to administration of 75 pounds of phosphorus pentoxide plus 7.5 pounds of anthrapurpurin per acre. The above soil composition is uniformly distributed in a band application along the bottom of a 2½ inch deep furrow in a seed plot of calcareous clay soil. In simultaneous operations, 5.73 grams (corresponding to 75 pounds phosphorus pentoxide per acre) of modified commercial triple superphosphate (0–45–0) fertilizer and 11.45 grams (corresponding to 150 pounds phosphorus pentoxide per acre) of unmodified commercial triple superphosphate (0–45–0) fertilizer are distributed in other 2½ inch deep furrows as checks.

About 2 inches of soil is then placed in the furrows and tomato seeds are then planted therein and covered with about ½ inch of soil. The seeds are then allowed to sprout and as soon as the true leaves start to form on the tomato seedlings, the tomato plants are thinned to about 24 plants per 18-inch row. About five weeks later, the plants are harvested and determinations made on the phosphorus uptake by the plants. The analysis for phosphorus is carried out as described in Example 3.

The results of these determinations show that the phosphorus uptake of the plants treated with a fertilizer composition modified with anthrapurpurin is greater than that of plants treated with twice the amount of phosphate fertilizer.

EXAMPLE 5

Modified fertilizer compositions containing various alizarin compounds are prepared as follows set forth in Table I:

Table I

| Fertilizer | | | Alizarin Compound | | |
|---|---|---|---|---|---|
| Composition | Type | Parts by Weight | Name | Structure | Parts by Weight |
| I | Triple superphosphate (0–45–0) | 2,222 | 3-Aminoalizarin, 2-sodium salt. | [structure] | 100 |
| II | do | 2,222 | Quinalizarin | [structure] | 100 |
| III | "10-10-10 fertilizer" (10-10-10) | 10,000 | Sodium 3-nitroalizarin | [structure] | 100 |
| IV | Superphosphate (0–19–0) | 5,270 | Carminic acid | [structure] | 100 |
| V | "Ammo-phos fertilizer" (16-20-0) | 5,000 | 1,3,4-Trihydroxyanthraquinone-2-sulfonic acid, sodium salt. | [structure] | 100 |
| VI | do | 5,000 | 3,4-dibromoalizarin | [structure] | 100 |

Table I—Continued

| Fertilizer | | | Alizarin Compound | | |
|---|---|---|---|---|---|
| Composition | Type | Parts by Weight | Name | Structure | Parts by Weight |
| VII | "10-10-10 fertilizer" (10-10-10) | 10,000 | Kermesic acid | [structure of kermesic acid tautomers] | 100 |

These compositions are uniformly distributed in separate operations in band applications at a rate corresponding to 75 pounds of phosphorus pentoxide plus 7.5 pounds of alizarin compound per acre and thereafter planted with tomato seeds. Check operations are simultaneously carried out by applying (a) the same amount of fertilizer and (b) double the amount of fertilizer but in each case omitting the alizarin compound. After about six weeks the plants are harvested and determined for phosphorus uptake by chemical analysis. The results show that all of the plants grown on soil treated with modified fertilizer compositions have a phosphorus uptake equal to or greater than that obtained by doubling the amount of fertilizer.

EXAMPLE 6

The effectiveness of alizarin compounds in reducing phosphorus fixation in soil was determined as follows: A 100 milliliter aqueous dispersion containing 1 gram of calcium bentonite clay, 2 millimoles of potassium acid phosphate ($KH_2PO_4$) and varying amounts of alizarin compound was allowed to stand for two weeks. Thereafter the mixture was centrifuged and analyses made for phosphorus according to the method described in Example 3. The amount of phosphorus remaining was compared with a check dispersion containing no alizarin compound. The results expressed as percent reduction in phosphorus (P) fixation were calculated as follows:

$$\text{Percent reduction} = 100 \frac{(P \text{ fixed in check soln.} - P \text{ fixed in test soln.})}{(P \text{ fixed in check soln.})}$$

The result is an index of increased availability of phosphorus, i.e., the greater the reduction of fixation, the greater the amount of available phosphorus. The results are given in Table II.

Table II

| Compound | Structure | Milligrams of Alizarin Compound/ 100 Milliliters | Percent Increase in Availability |
|---|---|---|---|
| Alizarin | [structure] | 13.4 | 48 |
| Purpurin | [structure] | 15.4 | 36 |
| Anthrapurpurin | [structure] | 15.4 | 27 |
| Sodium 3-Nitroalizarin | [structure] | 17.1 | 20 |
| 1,2,4,5,6,8-Hexahydroxyanthraquinone, 1-sodium salt | [structure] | 17.3 | 25 |

EXAMPLE 7

An operation is carried out as described in Example 6, except that sodium kaolinite is substituted for calcium bentonite. The results are given in Table III.

Table III

| Compound | | Milligrams of Alizarin Compound/ 100 Milliliters | Percent Increase in Availability |
|---|---|---|---|
| Carminic acid | (structure with CH₃, O, OH, CO(CHOH)₄CH₃, HO, OH, HOOC, O, OH) | 15.7 | 59 |
| 3-Alizarinsulfonic acid, methylammonium salt. | (structure with O, OH, OH, SO₃H·NH₂CH₃, O) | 21 | 100 |

EXAMPLE 8

Nutrient aqueous dispersions are prepared having the following compositions.

Components:  Parts by weight per million parts by weight of aqueous dispersion
Alizarin compound _____ 750
Ammonium nitrate _____ 5400
85 percent phosphoric acid (sp. gr., 1.7) _____ 8500

The alizarin compounds employed are (a) alizarin, (b) 5,8-dichloroalizarin, (c) 3-bromoalizarin, (d) 3-iodoalizarin, and (e) 3-alizarinsulfonic acid. The nutrient compositions thus prepared are applied as drench to pots containing tomato plants growing in 150 grams of soil in an amount sufficient to supply the following concentration of materials on a dry weight basis.

Components:  Parts by weight per million parts by weight of soil
Alizarin compound _____ 50
Ammonium nitrate (calculated as nitrogen) ___ 125
Phosphoric acid (calculated as P₂O₅) _____ 375

For check treatment, similar pots containing tomato plants were fertilized with a similar composition but containing no alizarin compound at a rate of 75 pounds of phosphorus pentoxide per acre (equal to 375 parts by weight of phosphorus pentoxide per million parts by weight of soil) and at a rate of 150 pounds of phosphorus pentoxide per acre (equal to 750 parts by weight of phosphorus pentoxide per million parts by weight of soil).

The plants were allowed to grow for two weeks after treatment and the aerial portions of the plants were harvested, dried and the dried weights compared with check plants grown on soil fertilizer at a rate of 75 pounds of phosphorus pentoxide per acre. In all cases the plants grown on soil treated with a nutrient composition containing an alizarin compound had substantially greater weight than the plants grown on check soil treated with a nutrient composition containing no alizarin compound.

I claim:

1. A method for increasing availability of phosporus in soil to plants, said soil containing difficultly available phosphorus, which comprises dispersing through said soil an alizarin compound having the formula

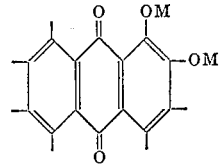

wherein each of the free valences is satisfied by a radical selected from the group consisting of —H, —Cl, —Br, —I, —NO₂, —OM, —NH₂, —SO₃M, —COOM, —CH₃, —COCH₃, and a hydroxyalkyl radical containing no more than 7 carbon atoms, and wherein each M is independently selected from the group consisting of hydrogen, alkali metal, ammonium and lower alkyl substituted ammonium, said lower alkyl containing from 1 to 4 carbon atoms, inclusive; and wherein said alizarin compound is administered in amounts to provide for the presence thereof of from about 0.25 to about 250 parts by weight per million parts by weight of soil.

2. A method according to claim 1 wherein the alizarin compound is 3-nitroalizarin.

3. A method according to claim 1 wherein the alizarin compound is sodium 3-alizarinsulfonate.

4. A method according to claim 1 wherein the alizarin compound is 6-sodium salt of naphthopurrin.

5. A method according to claim 1 wherein the alizarin compound is alizarin.

6. A method according to claim 1 wherein the alizarin compound is purpurin.

7. A method for treating soil containing difficultly available phosphorus to increase the uptake therefrom by plants of said phosphorus which comprises introducing into soil a composition comprising a soil treating adjuvant in intimate admixture with an alizarin compound having the formula

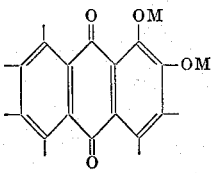

wherein each of the free valences is satisfied by a radical selected from the group consisting of —H, —Cl, —Br, —I, —NO$_2$, —OM, —NH$_2$, —SO$_3$M, —COOM, —CH$_3$, —COCH$_3$ and a hydroxyalkyl radical containing no more than 7 carbon atoms, and wherein each M is independently selected from the group consisting of hydrogen, alkali metal, ammonium and lower alkyl substituted ammonium, said lower alkyl containing from 1 to 4 carbon atoms, inclusive; and wherein said composition is administered in amounts sufficient to provide for the presence in soil of at least 0.25 part by weight of said alizarin compound per million parts by weight of soil.

8. A method according to claim 7 wherein the soil treating adjuvant is a phosphate fertilizer composition.

9. In the fertilization of soil with a phosphate fertilizer, the step which comprises administering to soil substantially simultaneously with the phosphate fertilizer an alizarin compound having the formula

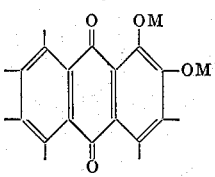

wherein each of the free valences is satisfied by a radical selected from the group consisting of —H, —Cl, —Br, —I, —NO$_2$, —OM, —NH$_2$, —SO$_3$M, —COOM, —CH$_3$, —COCH$_3$ and a hydroxyalkyl radical containing no more than 7 carbon atoms, and wherein each M is independently selected from the group consisting of hydrogen, alkali metal, ammonium and lower alkyl substituted ammonium, said lower alkyl containing from 1 to 4 carbon atoms, inclusive; and wherein said alizarin compound is supplied in amounts sufficient to provide for the presence thereof of from about 0.25 to about 250 parts by weight per million parts by weight of soil.

References Cited in the file of this patent

UNITED STATES PATENTS

| | | |
|---|---|---|
| 2,222,736 | Bancroft et al. | Nov. 26, 1940 |
| 2,222,737 | Bancroft et al. | Nov. 26, 1940 |
| 2,222,738 | Bancroft et al. | Nov. 26, 1940 |

OTHER REFERENCES

Flaig et al.: "Chemical Abstracts," vol. 46, p. 1620, 1952, original article appears in "Landwistchaftliche Forschung," vol. 3, 1951, pp. 66–89.

Otto: "Chemical Abstracts," vol. 47, p. 5495, 1953, original article appears in "Z Pflanzenerahr Dungung Bodenkunde," vol. 56, 1952, pp. 46–49.